United States Patent [19]

Kessinger, Jr.

[11] 4,216,973
[45] Aug. 12, 1980

[54] SEAL

[75] Inventor: Orville E. Kessinger, Jr., Blue Grass, Iowa

[73] Assignee: Caterpillar Tractor Co., Peoria, Ill.

[21] Appl. No.: 10,338

[22] Filed: Feb. 8, 1979

[51] Int. Cl.$^2$ .................. B62D 55/00; F16J 15/34
[52] U.S. Cl. ................................. 277/92; 305/11
[58] Field of Search ............ 277/91, 92, 83, 81 R; 305/11, 9

[56] References Cited

U.S. PATENT DOCUMENTS

| | | | |
|---|---|---|---|
| 3,414,274 | 12/1968 | Takahashi | 277/53 |
| 3,899,218 | 8/1975 | Blomstrom et al. | 305/9 |
| 4,062,550 | 12/1977 | Satsumabayashi | 277/92 |
| 4,087,099 | 5/1978 | Kurio | 277/92 |
| 4,132,418 | 1/1979 | Roli | 277/91 |

Primary Examiner—Robert I. Smith
Attorney, Agent, or Firm—Wegner, Stellman, McCord, Wiles & Wood

[57] ABSTRACT

An improved bearing seal (29) for use in a vehicle (10), such as a tractor, for preventing contamination of a pivot shaft bearing (23) or the like, which may be subjected to dirt, particulate matter, etc. The bearing seal (29) includes a lip seal (30), a labyrinth seal (32), and a dirt seal (33). The elements of the bearing seal are arranged in series relationship between one end (31) of the bearing and a shoulder (34) on the pivot shaft structure (21). The pivot shaft structure may define a swingable link (16) for mounting an idler (14) in the frame (15) of the vehicle trank (11). The labyrinth seal (32) may further define an abutment surface (35) for the dirt seal (33), and in the illustrated embodiment, defines a hardened washer having an inner diameter (39) slightly larger than the outer diameter of the pivot shaft (21) so as to define a sealing labyrinth therebetween. A guide boss (44) may be provided on the pivot shaft link portion (17) for cooperation with a frame portion (20) of the track mounting structure to prevent undesirable axial displacement of the pivot shaft (21).

16 Claims, 3 Drawing Figures

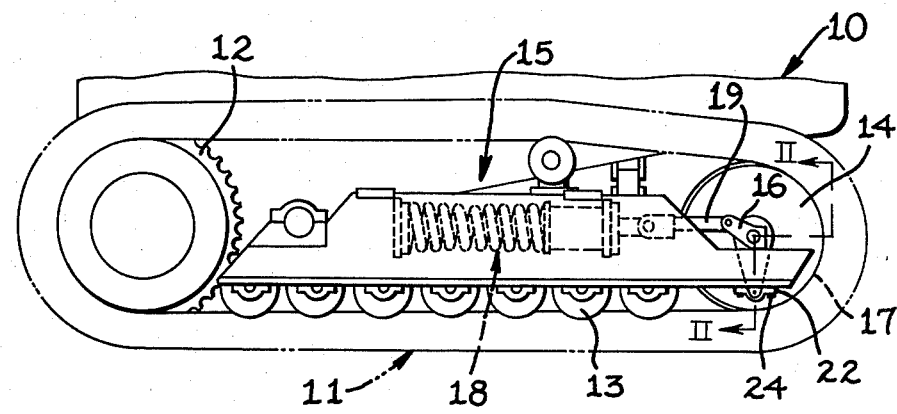
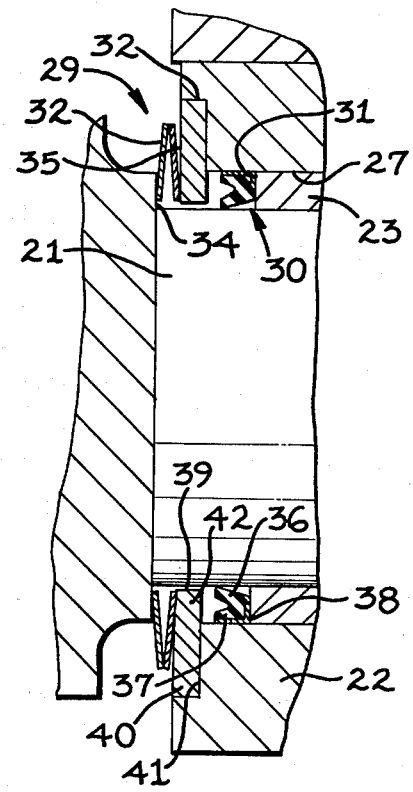

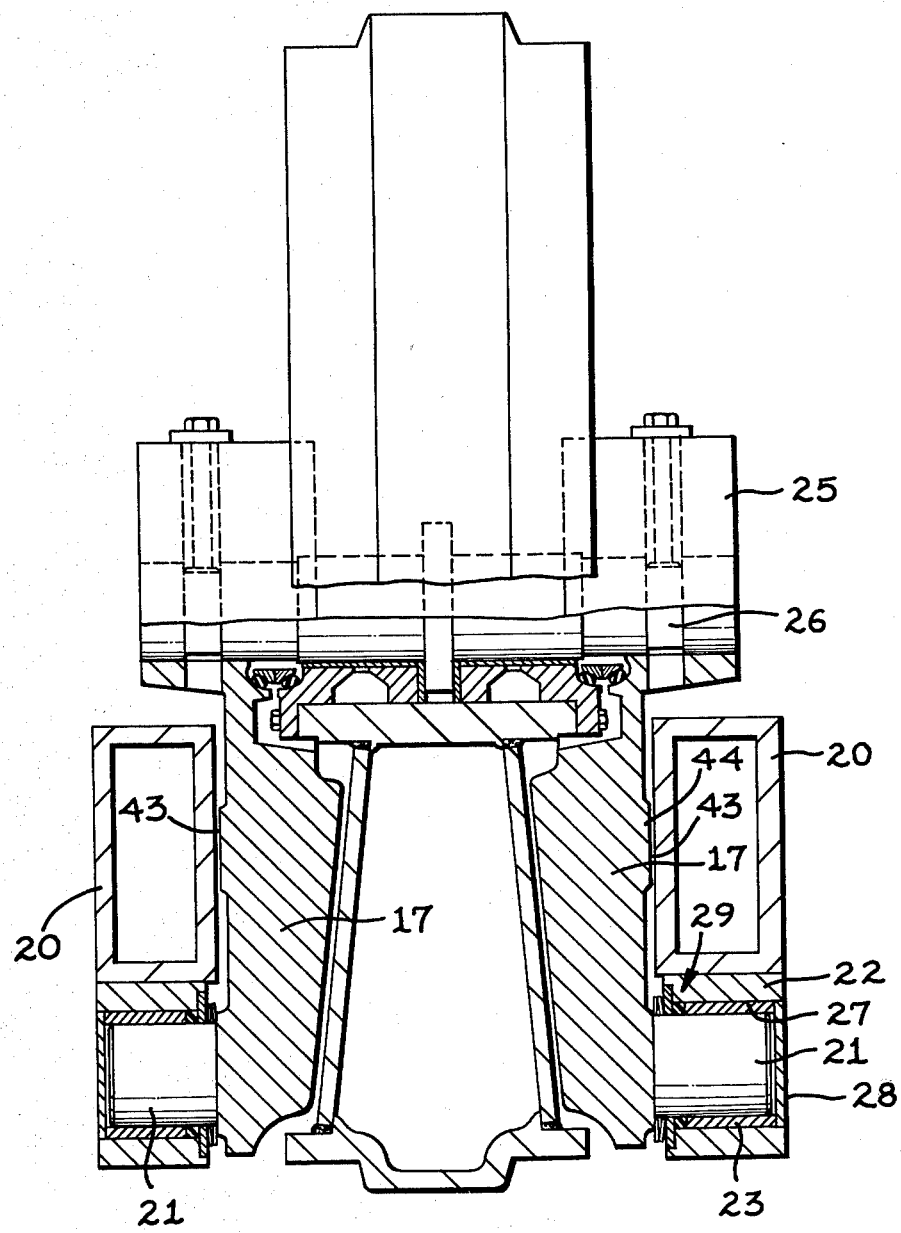

SEAL

TECHNICAL FIELD

This invention relates to the sealing of shafts and in particular to a seal arrangement for use in connection with idler shafts of vehicles, such as crawler tractors, loaders, and the like.

BACKGROUND ART

In U.S. Pat. No. 3,899,218 of Gary D. Blomstrom et al, which patent is owned by the assignee hereof, an improved track roller frame construction is disclosed for use with a track-type vehicle. The track assembly includes an idler supported for rotation on a pivot pin and for axial rocking movement by a pair of pin-supporting carriages disposed on either side of the idler. The carriages are individually pivotally connected to the track roller frame and each includes a rearwardly inclined arm connected to a yoke assembly by a pivot pin. The yoke assembly, in turn, is pivotally secured to a transverse pin carried by a connecting rod resiliently axially loaded by a recoil mechanism.

DISCLOSURE OF THE INVENTION

The present invention is concerned with such a vehicle structure and is more specifically directed to the provision therein of an improved means for effectively sealing the idler shaft to the mounting means so as to prevent dirt and foreign matter from adversely affecting the bearings thereof.

In one aspect of the present invention, the improved sealing means is provided for use with the structure having a shaft extending axially outwardly into an opening in a mounting member for rotation about the longitudinal axis of the shaft therein. The sealing means rotatively seals the shaft to the mounting member and, in the illustrated embodiment, includes an annular lip seal in the opening extending concentrically sealingly about the shaft and sealingly engaging the mounting member, an annular labyrinth seal in the opening axially inwardly adjacent the lip seal and extending concentrically about the shaft and spaced radially inwardly closely adjacent the mounting member to define a sealing labyrinth therebetween, and an annular dirt seal axially outwardly adjacent the labyrinth seal and extending concentrically to the shaft and movably sealed to the labyrinth seal and shaft.

The invention further comprehends the provision in such a structure of cooperating guide means on the shaft and mounting member for effectively maintaining the shaft against axial displacement so as to prevent damage to the seal means in the operation of the vehicle.

The shaft may define an axially outwardly facing shoulder for use in maintaining the seal means in position within the structure.

The labyrinth seal may be received in a radially inwardly opening recess of the mounting member.

The dirt seal may comprise a Belleville seal.

The lip seal may have a C-shaped cross section with one leg thereof sealingly engaging the mounting member and the other leg engaging the shaft.

An annular bearing may be disposed coaxially of the shaft at the outer end of the seal means. In the illustrated embodiment, the lip seal engages the bearing.

The bearing may be retained axially on the shaft by means of an outer retaining plate so as to maintain the disposition of the bearing relative to the seal.

Thus, the improved seal structure of the present invention is extremely simple and economical of construction while yet providing highly desirable features and advantages as discussed above.

BRIEF DESCRIPTION OF DRAWINGS

Other features and advantages of the invention will be apparent from the following description taken in connection with the accompanying drawing wherein:

FIG. 1 is a fragmentary side elevation of a vehicle having an improved sealing structure embodying the invention;

FIG. 2 is a fragmentary enlarged vertical section taken substantially along the line 2—2 of FIG. 1; and FIG. 3 is a further fragmentary enlarged vertical section of a portion of the structure illustrated in FIG. 2.

BEST MODE FOR CARRYING OUT THE INVENTION

In the exemplary embodiment of the invention as disclosed in the drawing, a vehicle generally designated 10 is shown to comprise a tractor vehicle provided with a track generally designated 11 which is suitably driven by a drive sprocket 12. The track is guided by means of a plurality of rollers 13 and is trained about an idler 14 comprising a portion of a roller frame 15. The roller frame further includes a pair of swing links 16 and 17, links 16 being connected to a recoil assembly generally designated 18 by means of a yoke 19.

The roller frame 15 includes a pair of side frames 20. The swing links 17 include outwardly projecting pivot portions 21 pivotally mounted in a bracket 22 by means of a bearing 23. As shown in FIG. 1, the bracket 22 may be secured to the side frame by suitable bolts 24.

At the upper end, the links 17 are secured to an idler shaft 25 by means of keys 26.

As best seen in FIG. 2, the bracket 22 defines a bore 27 in which the annular bearing 23 is mounted. Bearing 23 may comprise an oil-impregnated powder sleeve bearing and may be retained in position in the bore 27 by means of a retaining cap 28 at the outer end of the bore.

As can be seen from the fragmentary illustration of FIG. 1, the pivot mounting structure is disposed closely adjacent the track 11 so that it is an environment where dirt and other foreign matter are present. To prevent such material from contaminating the bearing 23, an improved bearing seal generally designated 29 is provided at the axially inner end of the shaft 21 to cooperate with the retainer cap 28 in effectively sealingly enclosing the bearing within the bracket 22.

The improved bearing seal 29 is illustrated in enlarged detail in FIG. 3 and is shown therein to include an annular lip seal 30 received in the opening defined by bore 27 axially inwardly of the inner end 31 of the bearing 23 and coaxially about the shaft structure defined by the pivot portion 21.

Bearing seal 29 further includes an annular labyrinth seal 32 spaced axially inwardly of the lip seal 30, and an innermost dirt seal 33 extending between an annular shoulder 34 on the links 17 and an outer surface 35 of the labyrinth seal element 32.

More specifically, the lip seal 30 comprises a crescent-type seal having a radially inner leg 36 sealingly engaging the pivot shaft portion 21, and a radially outer leg 37 sealingly engaging the bracket 22 in the bore 27. The lip seal may further include an L-shaped annular retainer 38 defining the radially outer and axially outer seal surfaces.

The labyrinth seal comprises a hardened steel washer having an inner diameter defined by the radially inner surface 39 thereof slightly larger than the outer diameter of the pivot shaft portion 21, thereby to define a sealing labyrinth therebetween. The radially outer portion 40 of the seal 32 is received in an axially inwardly and radially inwardly opening recess 41 in the bracket 22. The radially inner portion 42 of the labyrinth seal is spaced axially inwardly of the lip seal 30, as shown in FIG. 3.

The dirt seal 33, in the illustrated embodiment, comprises a Belleville seal. As best seen in FIG. 2, the swing link 17 is provided with guide surfaces 43 defined by axially outwardly extending bosses 44 formed integrally in each link. Slidable engagement of the surfaces 43 with the respective side frames limits the axial displacement of the links and, thus, prevents undesirable axial displacement of the shoulder 34 and pivot shaft portion 21 so as to effectively maintain the bearing seal arrangement as shown in FIG. 3 at all times.

The labyrinth seal 32 provides an improved bearing surface 35 for the Belleville seal 33 so as to provide long troublefree life of the bearing seal arrangement 29. Further, the labyrinth seal washer permits facilitated accurate sizing of the inner surface 32 thereof to provide an accurate labyrinth clearance providing the desired labyrinth seal functioning.

INDUSTRIAL APPLICABILITY

The improved bearing seal, as indicated above, is advantageously adapted for use in vehicles and the like where it is important to prevent contamination and damage of bearings or the like which are utilized in adverse environments as where dirt, particulate material, and other foreign matter are present. As discussed above, the bearing seal is advantageously used in connection with tractor-type vehicles wherein the seal may be used in conjunction with the means for mounting the idler of the track chain system.

The improved bearing seal may be utilized with minimum modification of existing track structures and, as discussed above, is extremely simple and economical of construction. The bearing seal may be readily serviced by removal of the bracket 22 as desired.

While the bearing seal structure has been disclosed in connection with such track-type vehicles, it will be obvious to those skilled in the art that the industrial applicability thereof is such that the bearing seal may be utilized in a wide range of different shaft seal structures.

Other aspects, objects and advantages of this invention can be obtained from a study of the drawings, the disclosure and the appended claims.

What is claimed is:

1. In a structure (10) having a shaft (21) extending axially outwardly into an opening (27) in a mounting member (22) for rotation about the longitudinal axis of the shaft therein, an improved sealing means (29) for rotatively sealing the shaft to the mounting member comprising:
   an annular lip seal (30) in said opening, said lip seal extending concentrically sealingly about the shaft (21) and sealingly engaging the mounting member (22);
   an annular labyrinth seal (32) in said opening axially inwardly adjacent said lip seal (30) and extending concentrically about the shaft (21) and spaced radially inwardly closely adjacent the mounting member (22) to define a sealing labyrinth therebetween; and
   an annular dirt seal (33) axially outwardly adjacent said labyrinth seal (32) and extending concentrically to said shaft (21) and movably sealed to said labyrinth seal (32) and shaft.

2. The structure of claim 1 wherein said shaft (21) defines an axially outwardly facing shoulder (34), said dirt seal (33) engaging said shoulder to be movably sealed to said shaft.

3. The structure of claim 1 wherein said mounting member (22) defines a radially inwardly opening recess (41), said labyrinth seal (32) defining a radially outer portion (40) carried by said mounting member (22) in said recess (41).

4. The structure of claim 1 wherein said dirt seal (33) comprises a Belleville seal.

5. The structure of claim 1 wherein said lip seal (30) has a C-shaped cross section opening parallel to said shaft axis and defining a radially outer leg (37) sealingly engaging said mounting member (22) and a radially inner leg (36) sealingly engaging said shaft (21).

6. The structure of claim 1 wherein an annular bearing (23) is disposed coaxially about the shaft (21) axially outwardly of said lip seal (30) for rotatably mounting the shaft (21) in the mounting member (22), said lip seal (30) engaging the axially inner end (31) of the bearing (23).

7. The structure of claim 6 wherein said bearing (23) comprises an oil-impregnated bearing.

8. The structure of claim 1 wherein said labyrinth seal (32) is spaced axially inwardly of said lip seal (30).

9. The structure of claim 1 wherein said dirt seal (33) has an outer diameter less than that of said labyrinth seal (32).

10. The structure of claim 1 wherein said labyrinth seal (32) comprises a rigid metal ring.

11. The structure of claim 1 wherein said sealing means (29) comprises an axial series arrangement of said lip seal (30), labyrinth seal (32) and dirt seal (33) retained coaxially between an axially inner, radial shoulder (34) on said shaft (21) and an annular bearing (23) axially outwardly of the sealing means (29).

12. The structure of claim 1 wherein said sealing means (29) comprises an axial series arrangement of said lip seal (30), labyrinth seal (32) and dirt seal (33) retained coaxially between an axially inner, radial shoulder (34) on said shaft (21) and an annular bearing (23) axially outwardly of the sealing means (29), said structure further including a retaining plate (28) axially outwardly of the bearing (23) for retaining the bearing (23) and lip seal (30) against axially outward displacement.

13. In a structure (10) having a shaft (21) extending axially outwardly into an opening (27) in a mounting member (22) for rotation about the longitudinal axis of the shaft therein, an improved sealing means (29) for rotatively sealing the shaft to the mounting member comprising:
   an annular lip seal (30) in said opening, said lip seal extending concentrically sealingly about the shaft (21) and sealingly engaging the mounting member (22);
   an annular labyrinth seal (32) in said opening axially inwardly adjacent said lip seal (30) and extending concentrically about the shaft (21) and spaced radially inwardly closely adjacent the mounting member (22) to define a sealing labyrinth therebetween;

an annular dirt seal (33) axially outwardly adjacent said labyrinth seal (32) and extending concentrically to said shaft (21) and movably sealed to said labyrinth seal (32) and shaft; and cooperating guide means (44) on the shaft (21) and mounting member (22) for effectively maintaining the shaft against axial displacement.

14. The structure of claim 13 wherein said shaft includes an integral link portion (16,17) and said guide means includes means defining a slide-face (43) juxtaposed to said mounting member.

15. The structure of claim 14 wherein said slide-face means comprises a boss formed integral on said link portion.

16. The structure of claim 13 wherein said guide means comprises means defining a pair of oppositely facing slide-faces and complementary confronting portions of said mounting member.

* * * * *